Dec. 15, 1970   M. RATTI   3,546,871
DAMPED SUPPORT FOR DOUBLE TWIST
Filed Oct. 2, 1968   2 Sheets-Sheet 2
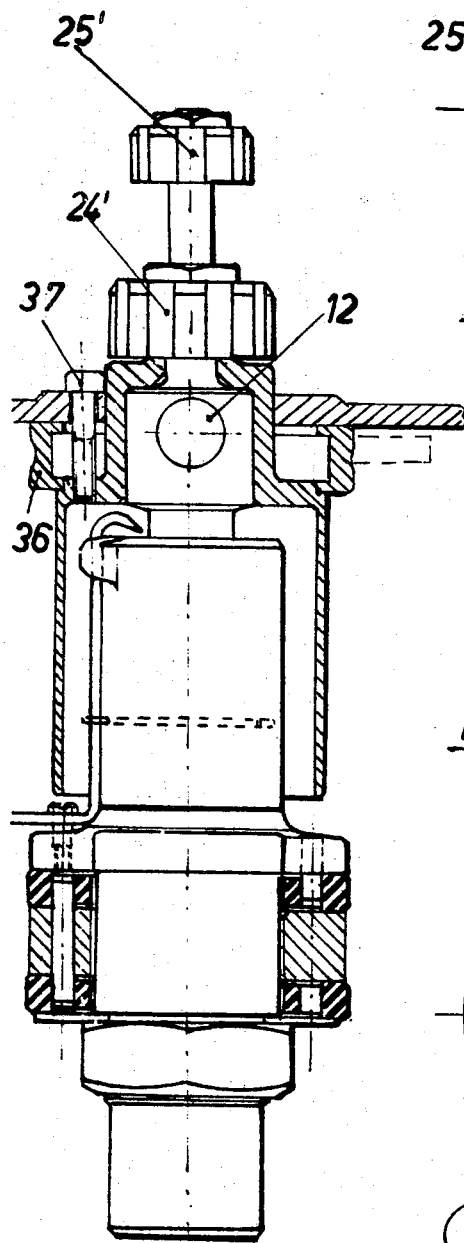
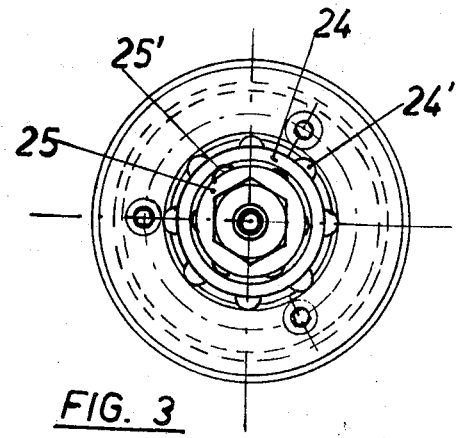
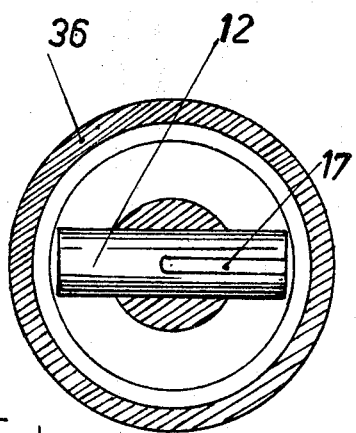
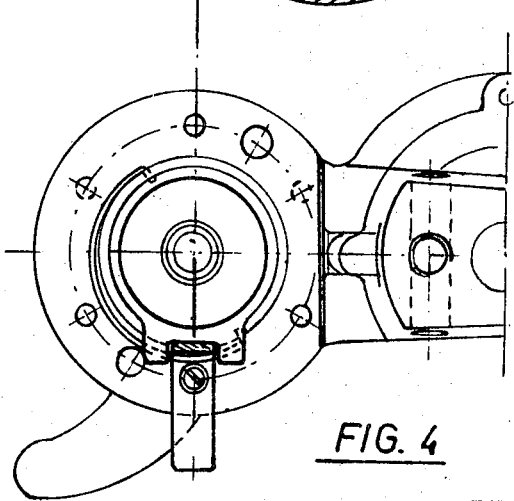
INVENTOR
Michele Ratti
BY Sparrow and Sparrow
ATTORNEYS

3,546,871
DAMPED SUPPORT FOR DOUBLE TWIST SPINDLE
Michele Ratti, 21016 Luino, Varese, Italy
Filed Oct. 2, 1968, Ser. No. 764,573
Claims priority, application Italy, Apr. 30, 1968,
15,923/68
Int. Cl. D01h 1/10, 7/86
U.S. Cl. 57—58.49                                3 Claims

ABSTRACT OF THE DISCLOSURE

A double twist spindle has a shaft composed of two parts and upper and lower supports for the shaft, whereby the upper part of the shaft is rotatably held by antifriction bearings in the stationary bobbin holder. The antifriction bearings are located in vibration-damping sleeves with axially extending projections on the outside thereof for facilitating insertion and removal of the bobbin.

---

The double twist spindles generally have two supports which are independent from each other. The rotating shaft extending upwards into a hollow portion above the support is sustained by suitable bearings provided in the spindle base which, in its turn, is connected in any suitable way to the machine frame. The shaft has the upper support mounted thereon and adapted to receive the stationary bobbin holder. Said shaft is set into rotation by a driving belt over a pulley so that the yarn coming from the bobbin, passing through the hollow shaft and coming out from an opening provided in the rotating part has the double twisting imparted thereto in any conventional manner.

Generally speaking the lower support is made of greased ball bearings or of a support of conventional type for spinning or twisting spindles with damping device and oil lubrication.

The upper support is almost always made of greased ball bearings directly disposed in the bobbin holder. The mentioned supports present some disadvantages.

Because of their high number of revolutions, the bearings of the lower support must be filled with grease periodically after relatively short running periods.

The operation of changing the lubricating grease requires a certain time. Since there are a great number of working spindles such a time loss weighs unfavourably on the overall efficiency of the machine.

For the upper support the grease changing operation requires the same time as for the lower support. Only in few cases the components of said support may be readily and rapidly disassembled to facilitate the introduction of grease. In this case however there is not provided an efficient protection of the bearings against the vibrations due to the unevenness of the rotating parts and of the belt drive system.

A principal object of the present invention is to avoid the above mentioned drawbacks. To this aim, the lower support is intended to be oil lubricated. The lower bearing works within an oil bath, while the upper bearing, thanks to the conical shape of the shaft, is lubricated with the minimum required oil layer.

The oil reserve is so big that an oil addition becomes necessary only after many years. Since the bobbin does not rotate, a possible lack of balance of same does not weigh on the running so that the spindle base needs not be provided with a damping device.

On the contrary, for removing the vibrations of the rotating parts from the frame of the machine there are provided damping elements. For the upper support the following two items are to be kept in mind: the stationary body of the bobbin together with its bobbin holder as a consequence of its weight of at least more than 3 kg. must be considered during the running of the machine as a stationary mass. All the vibrations transmitted by the shaft have, on the ball bearings, the effect of blows. For this reason the bearings are surrounded by rubber sleeves having a suitable outer profile, said sleeves being capable of damping the vibrations considerably. Since these bearings are lubricated with grease, their life might be considerably lengthened by renewing the grease. To facilitate this operation, the parts of said rubber sleeves receiving the vibrations are provided with projections disposed in the direction parallel to the longitudinal axis.

In this way the bobbin holder may be set and removed without having to use any tool, whereafter it is possible to readily accede to the bearings.

The mentioned projections with parallel axes have, with respect to the inner cavity of the bobbin holder, a given elastic compressibility in order to provide for the frictional resistance which is necessary for a good adherence.

If the projections receiving the vibrations would be disposed in another direction and not along the axis, they would bend during the insertion of the bobbin holder so that it would be more difficult to carry out this operation and said bobbin holder would not seat perfectly.

During the removal of the bobbin holder the blocking action would be inverted thereby causing a further loss of time.

If the sleeve would have a smooth outer surface the slide force required for the insertion and the removal would be even greater and the operation would become more difficult.

The accompanying drawings show a preferred embodiment of the invention.

FIG. 2 is an axial section rotated of 90° with respect to the one of FIG. 1.

FIG. 3 is a plan view on the upper support.

FIG. 4 is the plan view on the lower support.

FIG. 5 is a sectional view made with a plane passing through 5—5 in FIG. 1 and seen from above.

Figure 1:
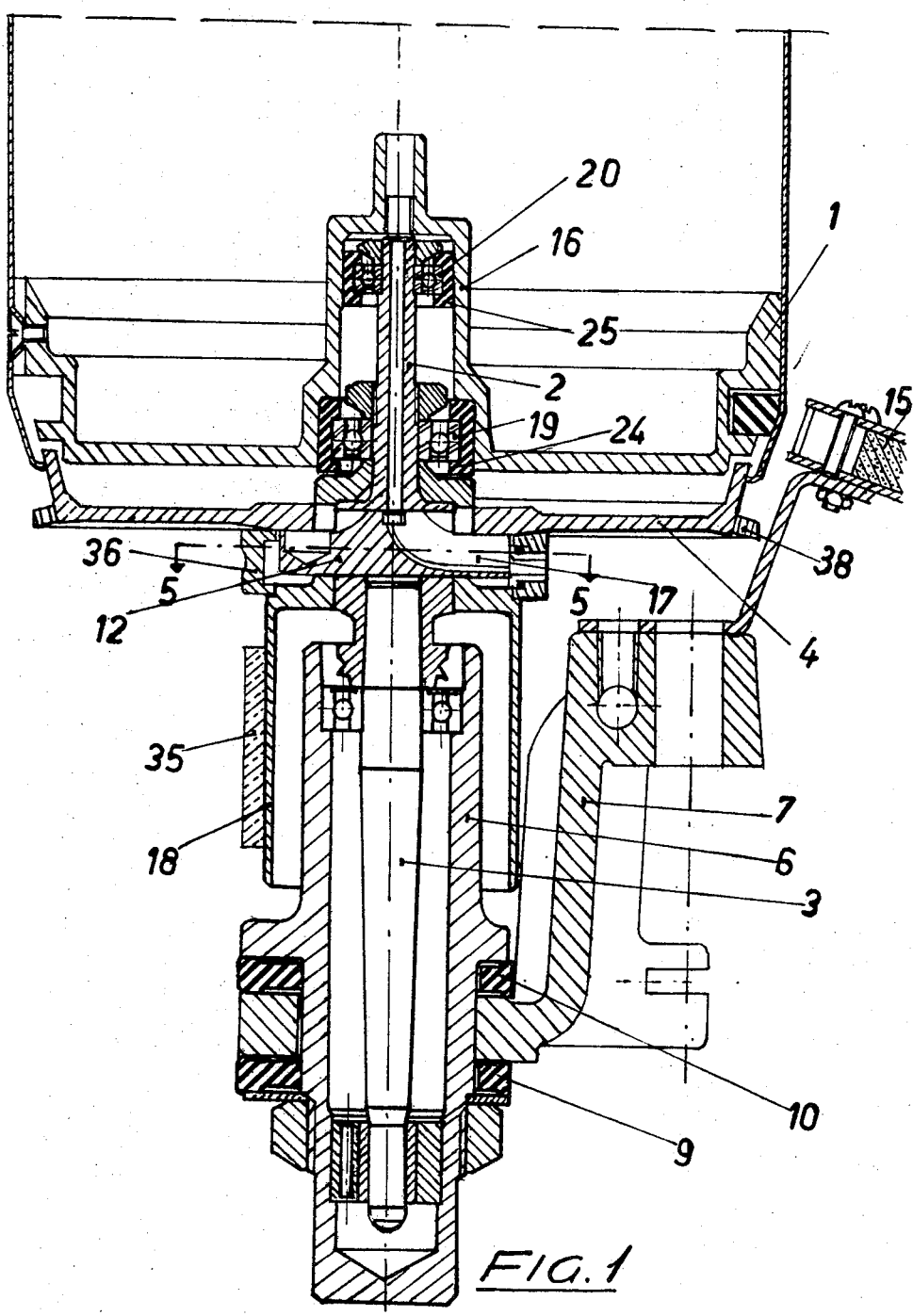
FIG. 1 is an axial sectional view passing through the upper and the lower support.

FIG. 1 shows a double twist spindle of generic and conventional type. The stationary bobbin holder 1 with its hub 16 is sustained by the upper support formed by the components 19–20–24–25 and is restrained from rotating by the magnet 15. The whole is disposed above the shaft formed by the two portions 2 and 3.

The yarn, as well known, follows this path: from the bobbin body it passes through the hollow portion of the shaft 2, through the conduit 17 and the eyelet 38 of the rotating disc 4 and then turns upwards to form a "ballon" and winds up on a winding bobbin.

The shaft 3 is set into rotation over a pulley 18 by a belt 35 which tangentially adheres to the pulley setting same into rotation.

The spindle base 6 containing the shaft 3 is fixed to the stationary frame 7 of the machine in a conventional way with interposition of the discs 9 and 10 which damp the vibrations.

According to the present invention the rubber sleeves 24–25 (FIG. 1) are provided at their periphery with longitudinal projections 24'–25' (FIG. 3), said sleeves being adapted to be introduced by a given pre-compression into the cavity of the hub 16.

Said pre-compression and said longitudinal disposition of the projections are such as to allow for the perfect seating of the stationary bobbin holder, on one side, and, on the other side, to facilitate the insertion and removal of same by an axial slide movement. Furthermore, in order to facilitate and speed up the cleaning operation of the yarn feeding conduit 17 which is situated within the cross pin 12, said cross pin 12 may be disassembled by unscrewing the screws 37 (FIG. 2) and removing the disc 4 and the ring 36.

What is claimed is:

1. A double twist spindle with a bobbin holder thereon, said spindle having lower and upper bearings and a cross pin with a conduit therein, and having means allowing easy insertion and removal of said bobbin holder for inspection of said bearings and the cleaning of said conduit in said cross pin, said spindle comprising a lower support for said lower bearings, said lower support having permanent oil lubricating means, and an upper support for said upper bearings, said upper support having grease lubricating means, an upper and a lower vibration-damping sleeve surrounding said upper bearings, a plurality of projections on the outside of said sleeves, a hub on said bobbin holder, said hub having a smaller upper and a larger lower bore for said sleeves, respectively, a removable disc on said spindle, said disc holding said cross pin, and a removable screw ring for facilitating the cleaning of said conduit in said cross pin.

2. A double twist spindle according to claim 1, said sleeves consisting of flexible elastic material, said projections being arranged in parallel direction to the axis of rotation.

3. A double twist spindle according to claim 2, said sleeves having diameters permitting said projections to be introduced into said hub of said bobbin holder under precompression.

References Cited
UNITED STATES PATENTS

| | | | |
|---|---|---|---|
| 2,127,921 | 8/1938 | Kent | 57—58.74 |
| 2,576,124 | 11/1951 | Kingsbury | 57—58.74 |
| 2,731,786 | 1/1956 | Klein | 57—58.74X |
| 2,961,824 | 11/1960 | Klein | 57—58.74X |
| 3,159,962 | 12/1964 | Franzer | 57—58.49 |
| 3,402,545 | 9/1968 | Nimtz et al. | 57—58.49 |

JOHN PETRAKES, Primary Examiner

U.S. Cl. X.R.

57—58.74, 135